US012602859B2

(12) United States Patent
Inomata et al.

(10) Patent No.: US 12,602,859 B2
(45) Date of Patent: Apr. 14, 2026

(54) INFORMATION PROCESSING SYSTEM, RAY TRACING METHOD, AND PROGRAM FOR RADIO WAVE PROPAGATION SIMULATION

(71) Applicant: NTT, Inc.

(72) Inventors: Minoru Inomata, Tokyo (JP); Wataru Yamada, Tokyo (JP); Nobuaki Kuno, Tokyo (JP); Motoharu Sasaki, Tokyo (JP)

(73) Assignee: NTT, Inc., Tokyo (JP)

( * ) Notice: Subject to any disclaimer, the term of this patent is extended or adjusted under 35 U.S.C. 154(b) by 281 days.

(21) Appl. No.: 18/284,276

(22) PCT Filed: Apr. 5, 2021

(86) PCT No.: PCT/JP2021/014536
§ 371 (c)(1),
(2) Date: Sep. 26, 2023

(87) PCT Pub. No.: WO2022/215135
PCT Pub. Date: Oct. 13, 2022

(65) Prior Publication Data
US 2024/0161384 A1 May 16, 2024

(51) Int. Cl.
*G06T 15/06* (2011.01)
*G06T 15/50* (2011.01)
*H04B 17/391* (2015.01)
(52) U.S. Cl.
CPC .............. *G06T 15/06* (2013.01); *G06T 15/50* (2013.01); *H04B 17/3912* (2015.01)

(58) Field of Classification Search
CPC .......... H04W 16/18–225; H04B 17/373–3913; G06T 15/06; G06T 17/05
See application file for complete search history.

(56) References Cited

U.S. PATENT DOCUMENTS

2010/0232529 A1    9/2010  Fettweis et al.
2016/0162613 A1*   6/2016  Shevchenko ........ G01V 1/3808
                                                              703/2

FOREIGN PATENT DOCUMENTS

JP         2001168812 A      6/2001

OTHER PUBLICATIONS

Hussain, Sajjad. Efficient ray-tracing algorithms for radio wave propagation in urban environments. Diss. Dublin City University, 2017. (Year: 2017).*

(Continued)

*Primary Examiner* — Ryan McCulley

(57) ABSTRACT

An information processing system includes: a first ray tracing unit configured to determine a two-dimensional ray trace from a transmission point at which a radio wave is transmitted, to a reception point at which the radio wave is received; a second ray tracing unit configured to determine a three-dimensional ray trace corresponding to the two-dimensional ray trace, using height information about the transmission point and the reception point; and a radio field intensity calculation unit that calculates the intensity of the radio wave at the reception point, using one or more three-dimensional ray traces determined by the second ray tracing unit.

9 Claims, 13 Drawing Sheets

(56) References Cited

OTHER PUBLICATIONS

Yamawaki et al. (2003) "Implementation of an Indoor Propagation Simulator using 2D-3D Hybrid Ray Tracing Method" Proceedings of the 2003 General Conference of the Institute of Electronics, Information and Communication Engineers, Japan, Mar. 22, 2003, Communications 1, p. 30.

Valenzuela, Reinaldo A "Ray tracing prediction of indoor radio propagation." 5th IEEE International Symposium on Personal, Indoor and Mobile Radio Communications, Wireless Networks— Catching the Mobile Future . . . vol. 1. IEEE, 1994. (Year: 1994).

U.S. Appl. No. 18/548,276, Office Action mailed Sep. 8, 2025, 18 pages.

* cited by examiner

Fig. 2

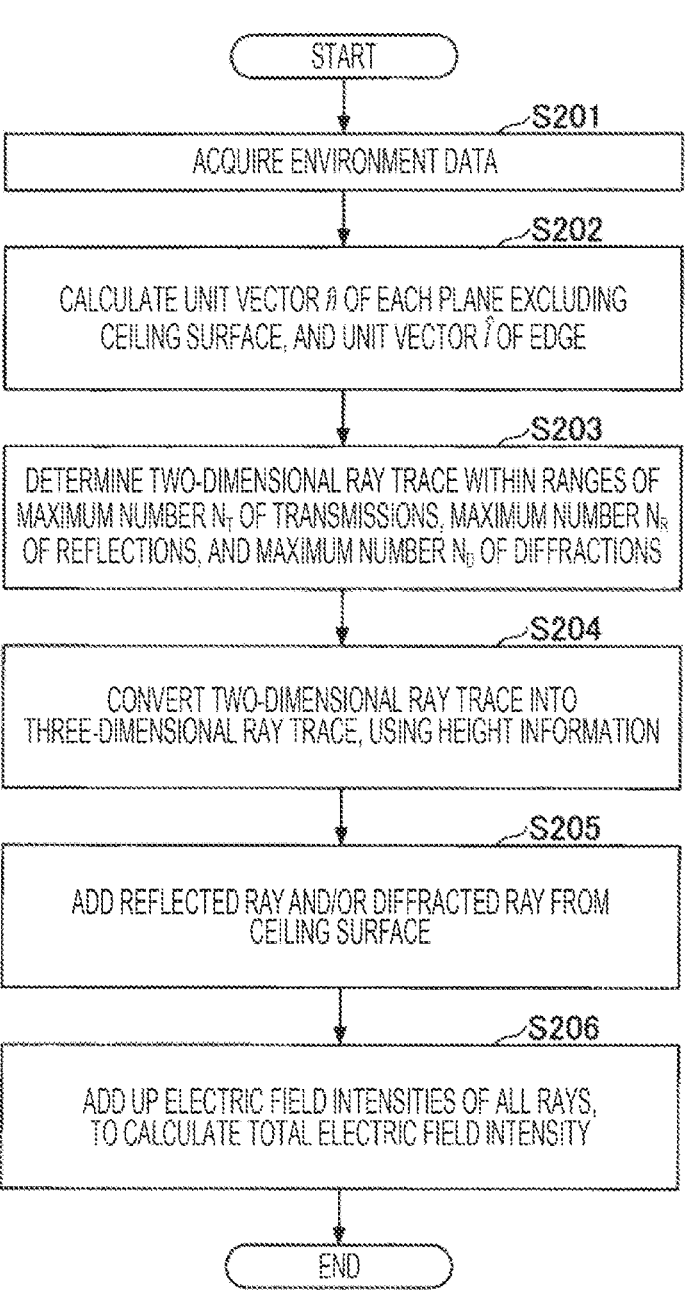

START

S201

ACQUIRE ENVIRONMENT DATA

S202

CALCULATE UNIT VECTOR $\hat{n}$ OF EACH PLANE EXCLUDING CEILING SURFACE, AND UNIT VECTOR $\hat{l}$ OF EDGE

S203

DETERMINE TWO-DIMENSIONAL RAY TRACE WITHIN RANGES OF MAXIMUM NUMBER $N_T$ OF TRANSMISSIONS, MAXIMUM NUMBER $N_R$ OF REFLECTIONS, AND MAXIMUM NUMBER $N_D$ OF DIFFRACTIONS

S204

CONVERT TWO-DIMENSIONAL RAY TRACE INTO THREE-DIMENSIONAL RAY TRACE, USING HEIGHT INFORMATION

S205

ADD REFLECTED RAY AND/OR DIFFRACTED RAY FROM CEILING SURFACE

S206

ADD UP ELECTRIC FIELD INTENSITIES OF ALL RAYS, TO CALCULATE TOTAL ELECTRIC FIELD INTENSITY

END

LEAVE DIFFRACTED RAY OF UNIT DIRECTIONAL VECTOR $\hat{r}_D$
SATISFYING EQUATION BELOW $$\hat{l} \cdot \hat{r}_D = \hat{l} \cdot \hat{r}_{in}$$

LEAVE REFLECTED RAY OF UNIT DIRECTIONAL
VECTOR $\hat{r}_R$ SATISFYING EQUATION BELOW $$\hat{r}_R = \hat{r}_{in} - 2(\hat{n} \cdot \hat{r}_{in})\,\hat{n}$$

Fig. 4

LINE-OF-SIGHT DETERMINATION IN VERTICAL PLANE (NO LINE OF SIGHT IS PRESENT)

LINE-OF-SIGHT DETERMINATION IN VERTICAL PLANE (LINE OF SIGHT IS PRESENT)

CASE WHERE LINE OF SIGHT IS PRESENT IN VERTICAL PLANE

Figure 9:
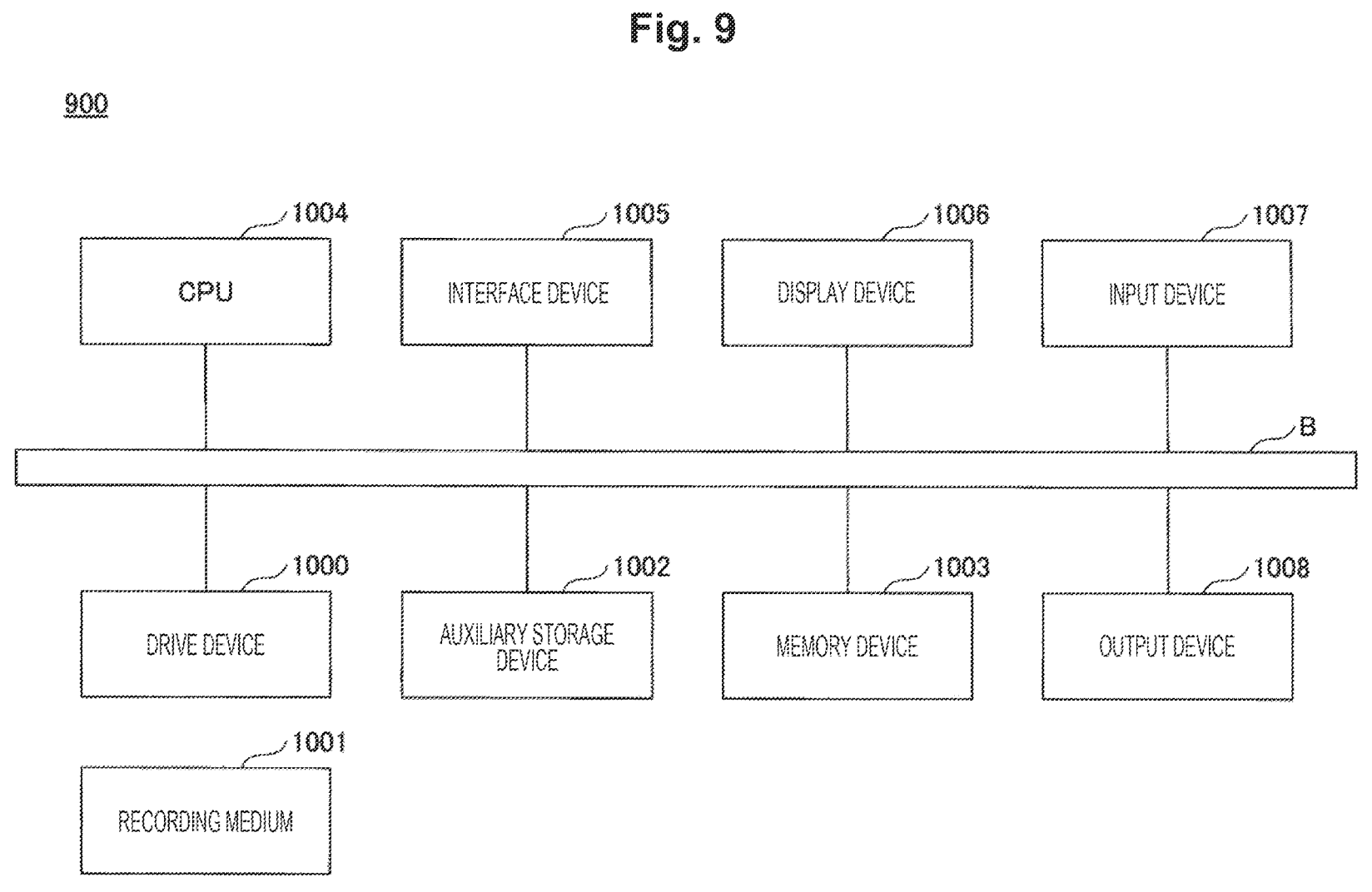

1004 CPU

1005 INTERFACE DEVICE

1006 DISPLAY DEVICE

1007 INPUT DEVICE

B

1000 DRIVE DEVICE

1001 RECORDING MEDIUM

1002 AUXILIARY STORAGE DEVICE

1003 MEMORY DEVICE

1008 OUTPUT DEVICE

INFORMATION PROCESSING SYSTEM, RAY TRACING METHOD, AND PROGRAM FOR RADIO WAVE PROPAGATION SIMULATION

CROSS-REFERENCE TO RELATED APPLICATIONS

This application is a U.S. 371 Application of International Patent Application No. PCT/JP2021/014536, filed on 5 Apr. 2021, the disclosure of which is hereby incorporated herein by reference in its entirety.

TECHNICAL FIELD

The present invention relates to an information processing system, a ray trace method, and a program.

BACKGROUND ART

As a method for performing a radio wave propagation simulation to be used for area evaluation and the like in a wireless communication system, there is ray tracing. In ray tracing, how radio waves (rays) transmitted from the transmission point are reflected or diffracted by a structural object that is present on the way to the reception point, and reach the reception point is tracked (traced) as trajectories of the respective rays, and the powers of all the rays that have reached the reception point are added up, to estimate the intensity of the radio waves at the reception point.

Also, there is a known indoor wireless communication system that uses ray tracing in simulating radio wave propagation characteristics between a wireless base station and a terminal station, and reduces electromagnetic interference on the basis of a simulation result (see Patent Literature 1, for example).

CONVENTIONAL ART LITERATURE

Patent Literature

Patent Literature 1: Japanese patent application publication No. 2001-168812

SUMMARY OF INVENTION

Problem to be Solved by Invention

By the conventional technology, in a case where ray tracing is performed in an environment such as an indoor environment in which many structural objects exist, for example, reflection or diffraction is repeated by many structural objects until rays reach the reception point, resulting in an increase in the calculation amount.

An embodiment of the present invention has been made in view of the above problem, and is to provide an information processing system that prevents an increase in the calculation amount when ray tracing is performed in an environment such as an indoor environment in which many structural objects exist.

Means to Solve Problem

To solve the above problem, an information processing system according to an embodiment of the present invention includes: a first ray tracing unit configured to determine a two-dimensional ray trace from a transmission point at which a radio wave is transmitted, to a reception point at which the radio wave is received; a second ray tracing unit configured to determine a three-dimensional ray trace corresponding to the two-dimensional ray trace, using height information about the transmission point and the reception point; and a radio field intensity calculation unit configured to calculate the intensity of the radio wave at the reception point, using one or more three-dimensional ray traces determined by the second ray tracing unit.

Advantageous Effects of Invention

According to an embodiment of the present invention, it is possible to provide an information processing system that prevents an increase in the calculation amount when ray tracing is performed in an environment such as an indoor environment in which many structural objects exist.

BRIEF DESCRIPTION OF DRAWINGS

FIG. 2 is a flowchart illustrating an example of a ray tracing process according to Example 1.

FIG. 4 is a flowchart illustrating an example of a diffracted ray calculation process according to Example 2.

FIG. 9 is a diagram illustrating an example of a hardware configuration of a computer.

MODE FOR CARRYING OUT INVENTION

The following is a description of an embodiment (the present embodiment) of the present invention, with reference to the drawings. The embodiment described below is merely an example, and embodiments to which the present invention is applied are not limited to the embodiment described below.

<System Configuration>

Figure 1:
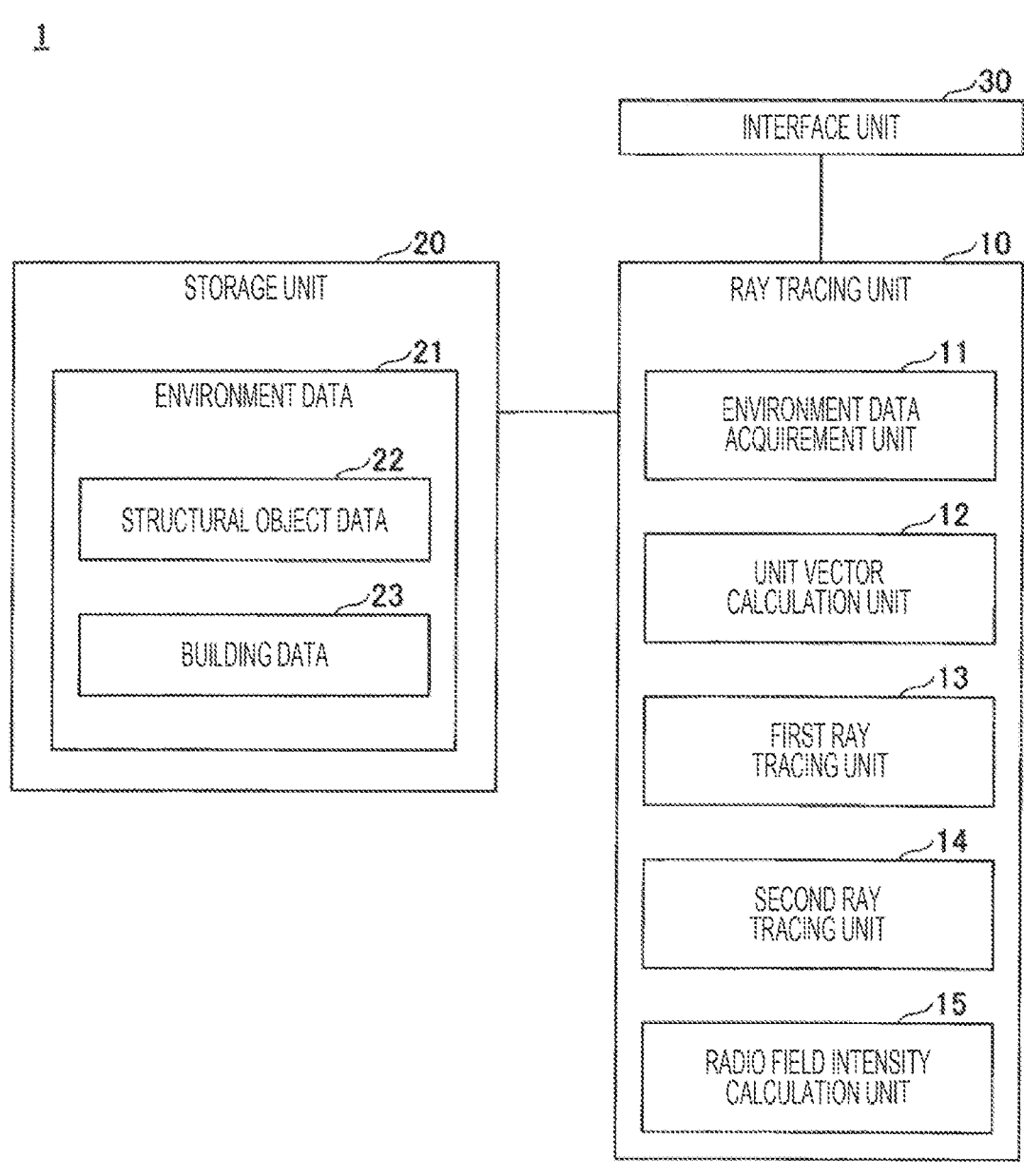
FIG. 1 is a diagram illustrating an example configuration of an information processing system according to the present embodiment.

FIG. 1 is a diagram illustrating an example configuration of an information processing system according to the present embodiment. In an information processing system 1, a computer included in the information processing system 1 executes a predetermined program, for example, to form a ray tracing unit 10, a storage unit 20, an interface unit 30, and the like. Note that each of the functional components mentioned above is not necessarily formed with a program that is executed by a physical machine (a computer), but may be formed with a program that is executed by a virtual machine in a cloud. Alternatively, the respective functional components mentioned above may be scattered in separate physical machines or virtual machines.

The storage unit 20 stores beforehand environment data 21 necessary for ray tracing to be performed by the ray tracing unit 10. The environment data 21 includes structural object data 22 indicating structural objects (such as desks, lockers, and electronic devices) in a building, and building data 23 indicating the inside (such as walls, floors, and ceilings, for example) of the building, for example. The structural object data 22 includes data indicating the widths, heights, shapes, positions, and the like of the respective surfaces of structural objects, and information such as the reflectances and transmittances of the respective surfaces, for example. Meanwhile, the building data 23 includes data indicating the widths, heights, shapes, positions, and the like of the respective surfaces of the walls, floors, ceilings, and the like of the building, and information such as the reflectances and transmittances of the respective surfaces, for example. Note that the structural object data 22 and the building data 23 may be integrated into one set of environment data 21, for example.

The environment data 21 may be data that is obtained by inputting data to a three-dimensional computer aided design (CAD) or the like by an operator or the like, or may be data that is obtained by converting three-dimensional environment map data or the like created by a simultaneous localization and mapping (SLAM) technology, into CAD data or the like, for example. Meanwhile, the storage unit 20 may be formed with a storage server outside the information processing system 1, a cloud service, or the like.

The interface unit 30 provides an application programming interface (API) for another system to use the ray tracing function provided by the information processing system 1, a user interface (UI) for a user to use the ray tracing function, and the like. For example, a user (or another system) can use the interface unit 30 to set, in the information processing system 1, parameters (such as the position of the transmission point, the position of the reception point, the frequency, and the transmission power, for example) necessary for ray tracing by the ray tracing unit 10. Also, the user (or another system) can acquire a result of a ray tracing process or the like performed by the ray tracing unit 10, using the interface unit 30.

(Ray Tracing Unit)

The ray tracing unit 10 performs ray tracing, using the environment data 21 stored beforehand in the storage unit 20 or the like. In the ray tracing, how radio waves (rays) transmitted from the transmission point are reflected, diffracted, or transmitted by a structural object that is present on the way to the reception point, and reach the reception point is tracked (traced) as trajectories of the respective rays, and the powers of all the rays that have reached the reception point are added up, to estimate the intensity of the radio waves at the reception point.

However, according to the conventional technology, in a case where ray tracing is performed in an environment such as an indoor environment in which many indoor structural objects exist, for example, reflection, diffraction, or transmission is repeated by many structural objects until rays reach the reception point. Therefore, the calculation amount increases, and the processing speed drops.

To solve the above problem, the ray tracing unit 10 according to the present embodiment includes an environment data acquisition unit 11, a unit vector calculation unit

12, a first ray tracing unit 13, a second ray tracing unit 14, and a radio field intensity calculation unit 15, for example.

The environment data acquisition unit 11 acquires the environment data 21 such as the structural object data 22 and the building data 23 of the target area of ray tracing, from the storage unit 20 or the like, for example.

The unit vector calculation unit 12 calculates the unit vector of each plane excluding the ceiling surface and the unit vector of an edge, from the environment data 21 acquired by the environment data acquisition unit 11. Note that the functions of the unit vector calculation unit 12 may be included in the first ray tracing unit 13 or the like, for example.

The first ray tracing unit 13 determines a two-dimensional ray trace from the transmission point at which radio waves are transmitted to the reception point at which radio waves are received in the building, on the basis of the environment data 21 indicating structural objects present in the building and the inside of the building. For example, the first ray tracing unit 13 emits a two-dimensional ray in a horizontal direction from the transmission point, and traces the two-dimensional ray to the reception point.

The second ray tracing unit 14 determines a three-dimensional ray trace corresponding to the two-dimensional ray trace determined by the first ray tracing unit 13, on the basis of height information about the transmission point and the reception point, and the environment data 21 (such as height information about structural objects and the like, for example). For example, the second ray tracing unit 14 converts the two-dimensional ray trace determined by the first ray tracing unit 13 into a three-dimensional ray trace, using height information (antenna heights) about the transmission point and the reception point, and height information about structural objects.

Preferably, when determining a three-dimensional ray trace, the second ray tracing unit 14 determines a reflected ray or a diffracted ray with restricting the launch angle of ray launching, on the basis of the Fermat's theorem, for example.

Further, in a case where there is not a line of sight between the transmission point and the reception point, the second ray tracing unit 14 replaces the structural object existing between the transmission point and the reception point with a flat metal plate, and determines a diffracted ray that is screen-diffracted by the flat metal plate.

Preferably, in a case where there is a plurality of structural objects between the transmission point and the reception point, the second ray tracing unit 14 adopts the Bullington model recommended in ITU-R Recommendations (ITU-R Recommendation p. 526, "Propagation by diffraction"), to determine a diffracted ray that is diffracted by the plurality of structural objects.

The radio field intensity calculation unit 15 calculates the intensity of the radio wave at the reception point, using one or more three-dimensional ray traces determined by the second ray tracing unit 14. For example, the radio field intensity calculation unit 15 calculates the reflection coefficient, the diffraction coefficient, and the transmission coefficient of one or more three-dimensional ray traces determined by the second ray tracing unit 14, and adds up the electric field intensities of the respective rays, to calculate the total electric field intensity.

In the information processing system 1 according to the present embodiment having the above configuration, the first ray tracing unit 13 determines a two-dimensional ray trace from the transmission point to the reception point, and the second ray tracing unit 14 determines a three-dimensional ray trace corresponding to the two-dimensional ray trace. In a case where the intensity of the radio wave at the reception point is estimated from ray tracing, the number of rays contributing to the intensity of the radio wave is normally small, and most of the rays are discarded according to conventional technologies. On the other hand, the information processing system 1 according to the present embodiment searches for principal rays, and thus, can speed up ray tracing without a decrease in precision.

Further, when determining a three-dimensional ray trace corresponding to a two-dimensional ray trace, the information processing system 1 according to the present embodiment restricts the launch angle of ray launching, to determine a reflected ray or a diffracted ray. Thus, the information processing system 1 can reduce the number of rays to be searched for, and further speed up the ray tracing.

Furthermore, in a case where there is not a line of sight between the transmission point and the reception point, and there is a plurality of structural objects between the transmission point and the reception point, the information processing system 1 according to the present embodiment adopts the Bullington model, to determine a diffracted ray that is diffracted by the plurality of structural objects. As the Bullington model is simpler and faster in calculation speed than other methods, the information processing system 1 can further speed up ray tracing.

<Process Flow>

Next, a process flow by a ray trace method according to the present embodiment is described.

Example 1

FIG. 2 is a flowchart showing an example of a ray tracing process according to Example 1. Note that an example of a process in a case where ray tracing is performed in an indoor environment is described herein. Also, as ray tracing algorithms, the imaging method and the ray-launching method are generally known, and an example process by the ray-launching method is described herein. By the ray-launching method, a ray is emitted from the transmission point at each predetermined angle, and the trajectories are geometrically tracked while intersection determination with a wall surface or an edge of the wall surface is performed for each emitted ray. Thus, the rays that have reached the reception point are determined.

In step S201, the environment data acquisition unit 11 acquires the environment data 21 including the structural object data 22 and the building data 23 of the target area of ray tracing, from the storage unit 20 or the like.

In step S202, the unit vector calculation unit 12 calculates the unit vector of each plane excluding the ceiling surface and the unit vector of an edge in the target area of ray tracing, from the environment data 21 acquired by the environment data acquisition unit 11. Note that the environment data 21 is created beforehand so as to indicate structural objects present in the building, and the inner walls, the floors, and the like of the building, as a plurality of planes.

In step S203, the first ray tracing unit 13 determines a two-dimensional ray trace from the transmission point at which radio waves are transmitted to the reception point at which radio waves are received in the building, on the basis of the environment data 21 indicating structural objects present in the building and the inside of the building. For example, the first ray tracing unit 13 emits two-dimensional rays from the transmission point in a horizontal plane, and traces the two-dimensional rays that reach the reception point within the ranges of a maximum number $N_T$ of transmissions, a maximum number $N_R$ of reflections, and a maximum number $N_D$ of diffractions. As a result, a two-dimensional ray trace that does not take into consideration reflection from the ceiling and the floor surface is determined.

Note that the maximum number $N_T$ of transmissions, the maximum number $N_R$ of reflections, and the maximum number $N_D$ of diffractions may be set with the use of the interface unit 30 or the like, for example, before the start of ray tracing, for example. Alternatively, in a case where the values of the maximum number $N_R$ of reflections and the maximum number $N_D$ of diffractions have not been set, the first ray tracing unit 13 may determine a two-dimensional ray trace, using default values ($N_T$=1, $N_R$=1, and $N_D$=1, for example).

In step S204, the second ray tracing unit 14 converts the two-dimensional ray trace, which has been determined by the first ray tracing unit 13 in step S203, into a three-dimensional ray trace.

Figure 3:
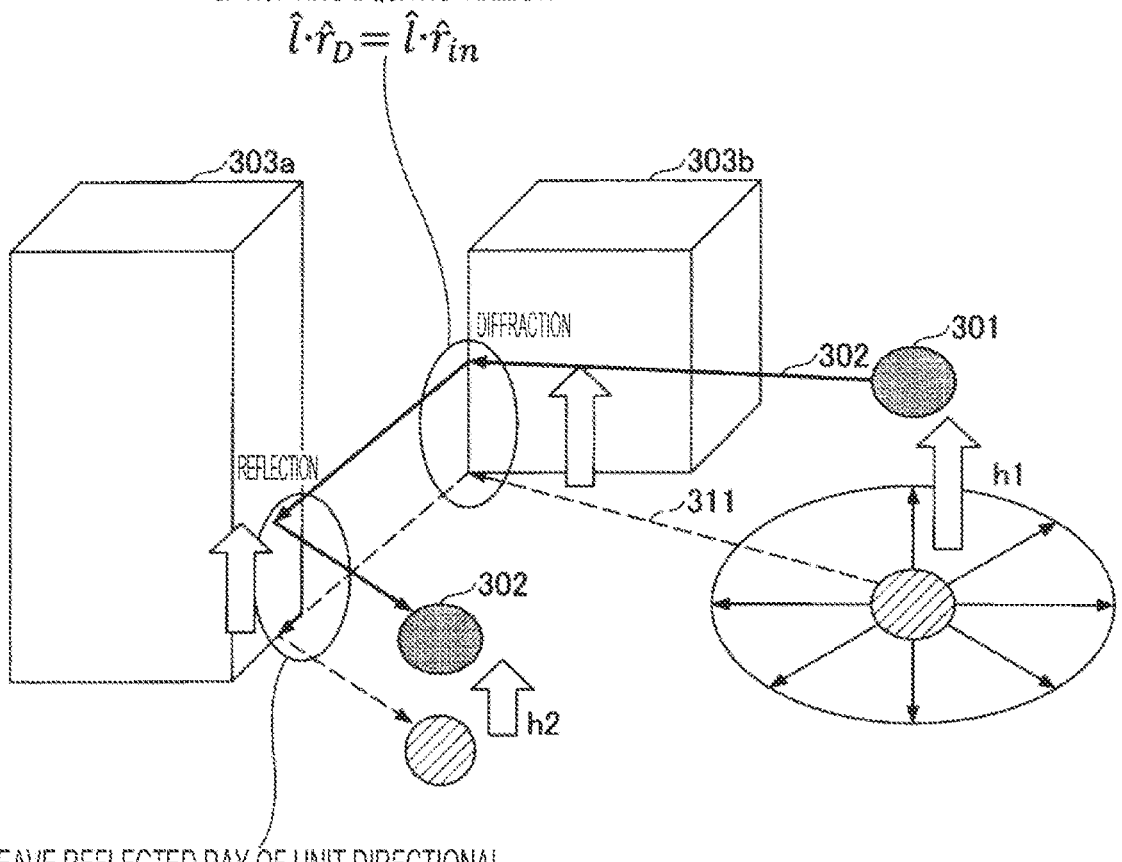
FIG. 3 is a diagram for explaining a three-dimensional ray trace according to Example 1.

FIG. 3 is a diagram for explaining a three-dimensional ray trace according to Example 1. In FIG. 3, dashed-line arrows indicate an example of a two-dimensional ray trace 311 determined by the first ray tracing unit 13. The two-dimensional ray trace 311 is a two-dimensional ray trace in which a two-dimensional ray emitted from the transmission point is diffracted at an edge of a structural object 303*b*, is then reflected on a plane of a structural object 302*a*, and reaches the reception point.

Two-dimensional ray traces to be determined by the first ray tracing unit 13 include not only the above, but also a two-dimensional ray trace that directly reaches the reception point from the transmission point, and a two-dimensional ray trace that is reflected, diffracted, or transmitted by another structural object, a wall of the building, or the like and then reaches the reception point. Here, the two-dimensional ray trace 311 that is reflected once and is diffracted once is illustrated as an example for explanation.

The second ray tracing unit 14 adds the height h1 of a transmission point 301, the height h2 of a reception point 302, the heights of the structural objects 303*a* and 303*b*, and the like to the two-dimensional ray trace 311 illustrated in FIG. 3, for example, to determine a three-dimensional ray trace 312 corresponding to the two-dimensional ray trace 311.

For example, the second ray tracing unit 14 causes a three-dimensional ray having intersected a plane of the structural object 303*a* or the like to re-emit in the reflection direction. In this case, on the basis of the Fermat's theorem, the second ray tracing unit 14 leaves a reflected ray of a unit directional vector $r_R{}^\wedge$ that satisfies Expression (1) shown below, and excludes the other reflected rays, for example.

[Math. 1]

$$\hat{r}=\hat{r}_{in}-2(\hat{r}i\cdot\hat{r}_{in})\hat{r}i \tag{1}$$

Note that, as illustrated in FIG. 3, the symbol of the unit directional vector $r_R{}^\wedge$ is obtained by adding a hat symbol (or a circumflex) to the character string "$r_R$". Since a hat symbol cannot be added to a character string in the text of this specification, it is written as "$r_R{}^\wedge$". The same applies to other symbols "$r_{in}{}^\wedge$", "$n^\wedge$", and "$l^\wedge$", "$r_D{}^\wedge$", and the like in Expression (2).

In Expression (1), $r_{in}{}^\wedge$ represents a unit directional vector indicating the ray incident direction, and $n^\wedge$ represents the unit vector (normal vector) in a plane with which the ray intersects. By restricting the reflected-ray emitting direction in this manner, the information processing system 1 can reduce the amount of three-dimensional ray calculation.

Also, the second ray tracing unit 14 causes a three-dimensional ray having intersected the edge of the structural object 303a or the like to re-emit in the diffraction direction. In this case, on the basis of the Fermat's theorem, the second ray tracing unit 14 leaves a diffracted ray of a unit directional vector $r_D{}^\wedge$ that satisfies Expression (2) shown below, and excludes the other diffracted rays, for example.

[Math. 2]

$$\hat{l}\cdot\hat{r}_D=\hat{l}\cdot\hat{r}_{in} \tag{2}$$

In Expression (2), $l^\wedge$ represents the unit vector of the edge with which the ray intersects, and $r_{in}{}^\wedge$ represents the unit directional vector indicating the ray incident direction. By restricting the diffracted-ray emitting direction in this manner, the information processing system 1 can reduce the amount of three-dimensional ray calculation.

Figure 4:
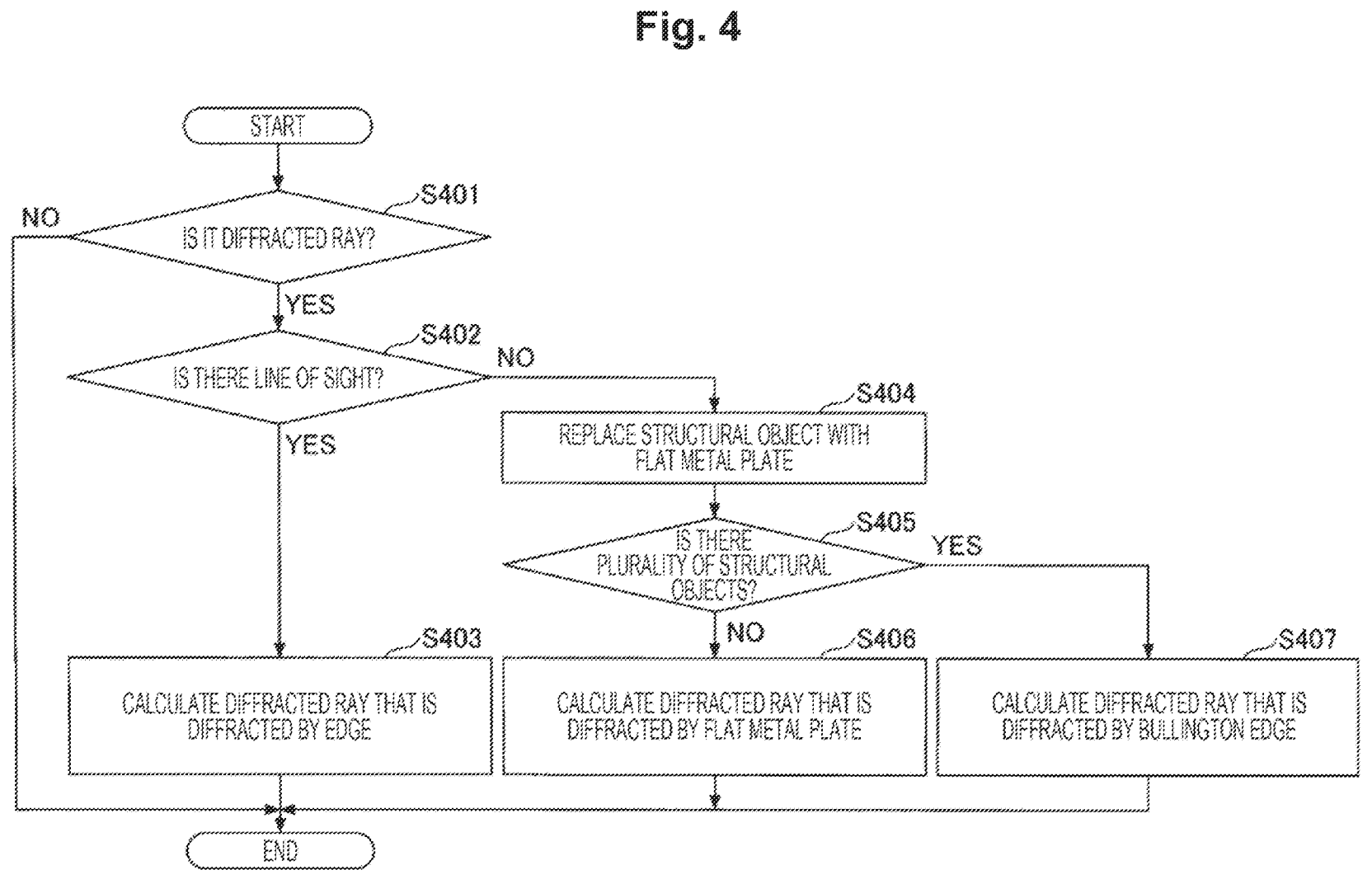

Note that the second ray tracing unit 14 also determines a reflected ray, a diffracted ray, and the like from a floor surface, for example, as the height h1 of the transmission point 301 and the height h2 of the reception point 302 are added to the two-dimensional ray trace 311 illustrated in FIG. 4.

In step S205, the second ray tracing unit 14 adds a reflected ray and/or a diffracted ray from the ceiling surface to the three-dimensional ray trace determined in step S203. For example, the second ray tracing unit 14 refers to the building data 23 and the like, to identify the plane indicating the ceiling of the building, and determines a ray that starts from the transmission point 301, is reflected or diffracted by the ceiling surface, and reaches the reception point 302.

In step S206, the radio field intensity calculation unit 15 calculates the intensity (the electric field intensity, for example) of the radio wave at the reception point, using all the three-dimensional ray traces determined by the second ray tracing unit 14. For example, the radio field intensity calculation unit 15 acquires, from the environment data 21, information such as the reflectance and transmittance of the radio waves on the respective surfaces of the structural objects and the inside of the building, calculates the reflection coefficients, the diffraction coefficients, and the transmission coefficients of all the retrieved rays, and adds up the electric field intensities of all the rays, to calculate the total electric field intensity. Note that a conventional ray trace method can be applied to the processing in step S211.

As described above, according to Example 1, it is possible to provide an information processing system that prevents an increase in the calculation amount when ray tracing is performed in an environment such as an indoor environment in which many structural objects exist.

Example 2

In Example 2, an example of a diffracted ray calculation process to be performed by the second ray tracing unit 14 to convert a two-dimensional ray trace into a three-dimensional ray trace in step S204 in FIG. 2 is described.

FIG. 4 is a flowchart illustrating an example of a diffracted ray calculation process according to Example 2.

In step S401, the second ray tracing unit 14 determines whether the target ray is a diffracted ray. If the target ray is a diffracted ray, the process in and after step S402 is performed.

In step S402, the second ray tracing unit 14 determines whether there is a line of sight between the transmission point and the reception point. For example, in a case where a radio wave (a ray) emitted from the transmission point directly reaches the reception point, the second ray tracing unit 14 determines that there is a line of sight between the transmission point and the reception point.

Figure 5A:
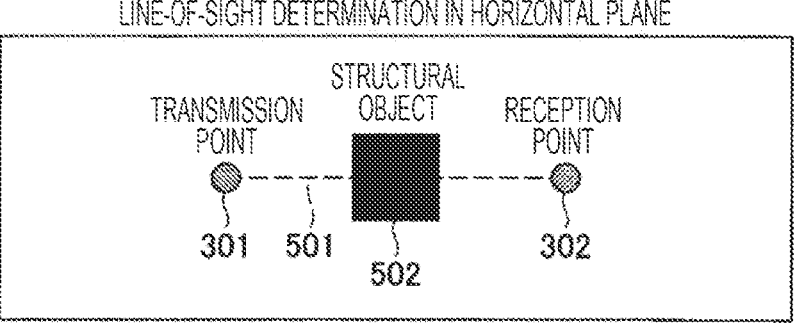
FIG. 5A is a diagram (1) for explaining an example of line-of-sight determination according to Example 2.

FIGS. 5A to 5D are diagrams for explaining an example of line-of-sight determination according to Example 1. For the two-dimensional ray trace determined in step S203 in FIG. 2 in a horizontal plane, the second ray tracing unit 14 determines whether a structural object 502 is present in a route 501 between the transmission point 301 and the reception point 302 as illustrated in FIG. 5A, for example. Here, if the structural object 502 does not exist in the route 501 between the transmission point 301 and the reception point 302, the second ray tracing unit 14 determines that there is a line of sight between the transmission point 301 and the reception point 302.

Figure 5B:
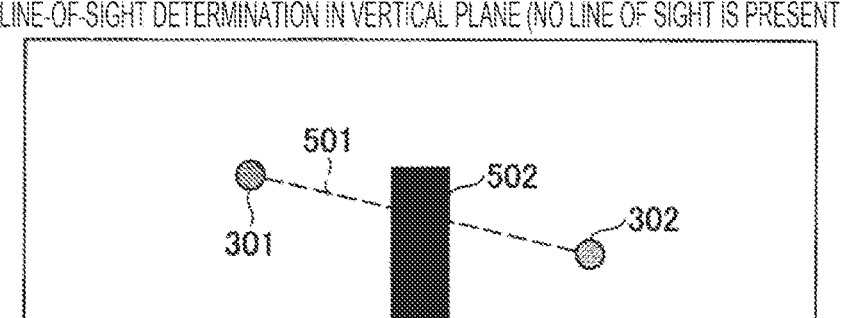
FIG. 5B is a diagram (2) for explaining an example of line-of-sight determination according to Example 2.
Figure 5C:
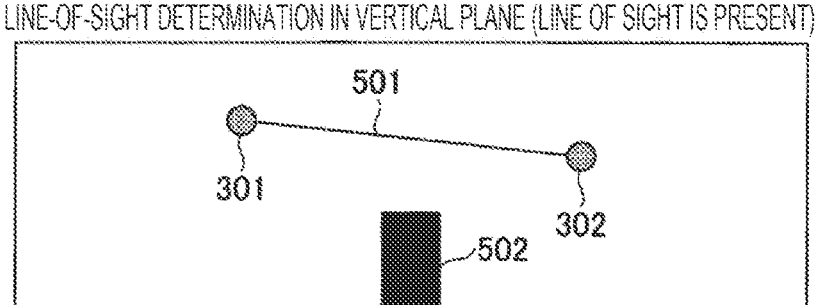
FIG. 5C is a diagram (3) for explaining an example of line-of-sight determination according to Example 2.
Figure 5D:
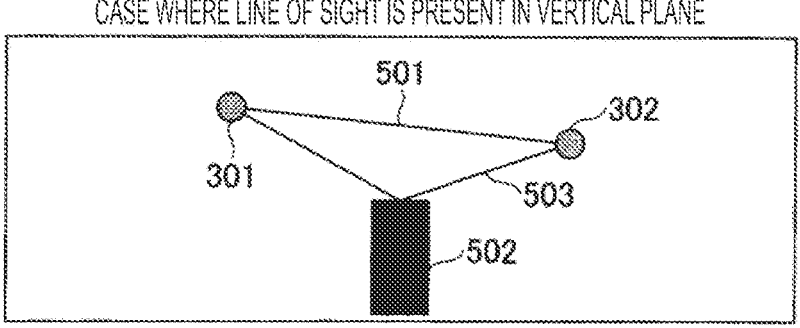
FIG. 5D is a diagram (4) for explaining an example of line-of-sight determination according to Example 2.

If the structural object 502 exists in the route 501 between the transmission point 301 and the reception point 302, on the other hand, the second ray tracing unit 14 performs line-of-sight determination in a vertical plane extending through the transmission point 301 and the reception point 302 as illustrated in FIGS. 5B and 5C, for example. If the structural object 502 exists in the route 501 between the transmission point 301 and the reception point 302 as illustrated in FIG. 5B, for example, the second ray tracing unit 14 determines that there is not a line of sight between the transmission point 301 and the reception point 302. If the structural object 502 does not exist in the route 501 between the transmission point 301 and the reception point 302 as illustrated in FIG. 5C, on the other hand, the second ray tracing unit 14 determines that there is a line of sight between the transmission point 301 and the reception point 302. Note that, in this case, when determining a three-dimensional ray trace, the second ray tracing unit 14 determines a reflected ray 503 from the upper surface of the structural object 502 as illustrated in FIG. 5D, instead of a reflected ray from the floor surface.

Although the second ray tracing unit 14 performs the line-of-sight determination in the above description, the present embodiment is not limited to this. For example, the ray tracing unit 10 may further include a line-of-sight determination unit that performs the line-of-sight determination.

Referring now back to FIG. 4, explanation of the flow-chart is continued. If there is a line of sight between the transmission point 301 and the reception point 302 in step S402, the second ray tracing unit 14 proceeds to step S403. If there is not a line of sight between the transmission point 301 and the reception point 302, on the other hand, the second ray tracing unit 14 proceeds to step S404.

In case of proceeding to step S403, the second ray tracing unit 14 calculates a diffracted ray that is diffracted at an edge of a structural object or the like as described above with reference to FIG. 3, for example.

In case of proceeding to step S404, on the other hand, the second ray tracing unit 14 replaces the structural object present between the transmission point and the reception point with a flat metal plate.

In step S405, the second ray tracing unit 14 determines whether there is a plurality of structural objects between the transmission point and the reception point. If there is not a plurality of structural objects, the process proceeds to step S406. If there is a plurality of structural objects between the transmission point and the reception point, on the other hand, the second ray tracing unit 14 proceeds to step S407.

In case of proceeding to step S406, the second ray tracing unit 14 calculates a diffracted ray that is screen-diffracted by the flat metal plate that has replaced the structural object between the transmission point and the reception point.

In case of proceeding on to step S407, on the other hand, the second ray tracing unit 14 calculates a diffracted ray for analyzing a plurality of structural objects present between the transmission point and the reception point, using the Bullington model.

Figure 6A:
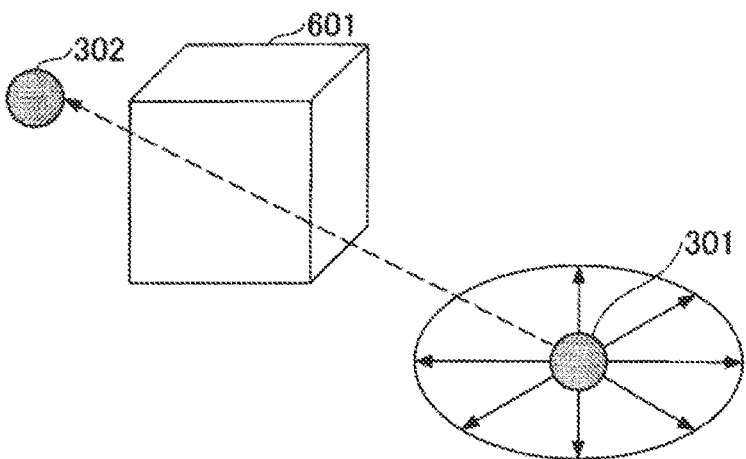
FIG. 6A is a diagram (1) for explaining the process to be performed according to Example 2 in a case where there is not a line of sight.
Figure 6B:
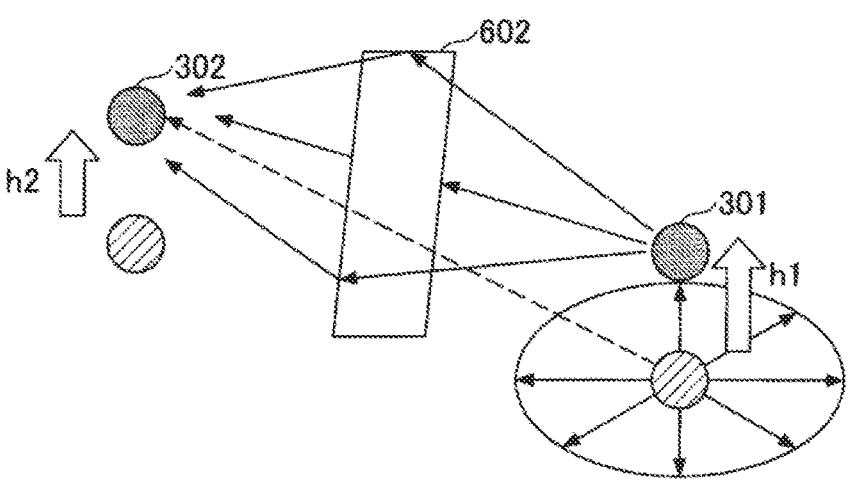
FIG. 6B is a diagram (2) for explaining the process to be performed according to Example 2 in a case where there is not a line of sight.

FIGS. 6A and 6B are diagrams for explaining the process to be performed according to Example 2 in a case where there is not a line of sight. In a case where there is one structural object 601 between the transmission point 301 and the reception point 302 as illustrated in FIG. 6A, the second ray tracing unit 14 replaces the structural object 601 with a flat metal plate 602 as illustrated in FIG. 6B. The second ray tracing unit 14 also calculates screen-diffracted waves on the top, the right side, and the left side of the flat metal plate 602, to determine diffracted rays.

Figure 7:
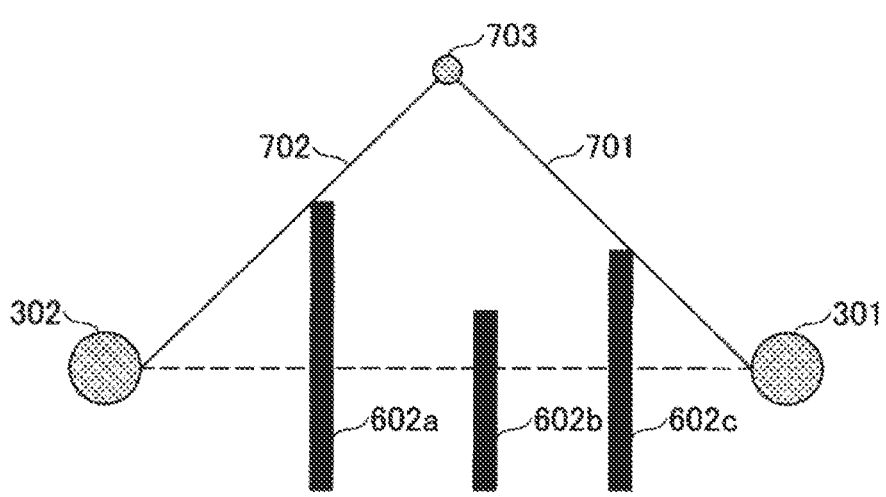
FIG. 7 is a diagram for explaining the process to be performed according to Example 2 in a case where there is a plurality of structural objects.

FIG. 7 is a diagram for explaining the process to be performed according to Example 2 in a case where there is a plurality of structural objects. If there is a plurality of structural objects between the transmission point 301 and the reception point 302, the second ray tracing unit 14 replaces the plurality of structural objects with a plurality of flat metal plates 602a, 602b, and 602c, as illustrated in FIG. 7. The second ray tracing unit 14 adopts the Bullington model, to calculate a diffracted ray that is diffracted by the plurality of flat metal plates 602a, 602b, and 602c.

For example, the second ray tracing unit 14 calculates a virtual interception point 703, which is the intersection of a transmission-side limit line of sight 701 passing through the transmission point 301 and the upper edge of the flat metal plate 602c and a reception-side limit line of sight 702 passing through the reception point 302 and the upper edge of the flat metal plate 602a. The second ray tracing unit 14 also calculates a diffracted wave diffracted at the virtual knife edge (Bullington edge) at the virtual interception point 703, to determine a diffracted ray. By this method, the second ray tracing unit 14 can determine a diffracted ray that is diffracted by a plurality of structural objects with a smaller amount of calculation.

Through the above process, the second ray tracing unit 14 can speed up the diffracted ray calculation in a case where there is not a line of sight between the transmission point and the reception point.

Example 3

Figure 8:
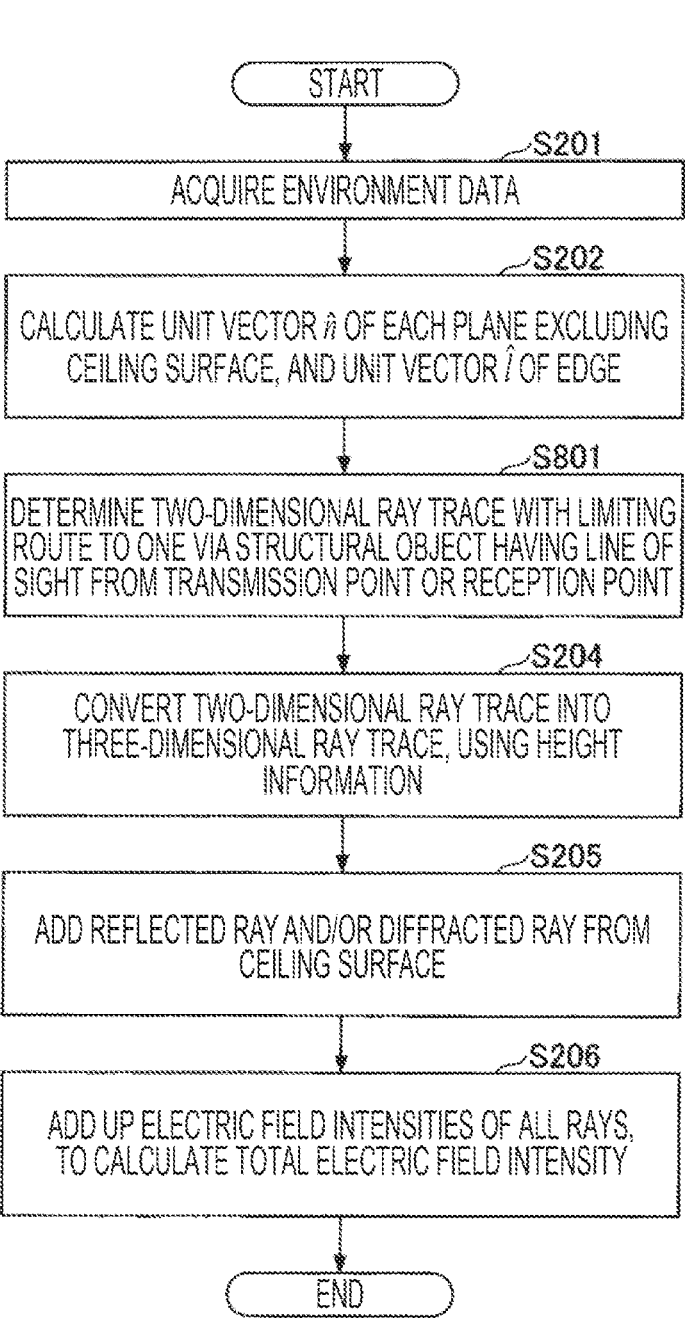
FIG. 8 is a flowchart illustrating an example of a ray tracing process according to Example 3.

FIG. 8 is a flowchart showing an example of a ray tracing process according to Example 3. Note that, among the processes illustrated in FIG. 8, the processes other than step S801 are the same as those in the ray tracing process according to Example 1 described with reference to FIG. 2, and therefore, the differences from the ray tracing process according to Example 1 are mainly described herein.

In step S203 in FIG. 2, the first ray tracing unit 13 determines a two-dimensional ray trace that reaches the reception point from the transmission point within the ranges of the maximum number $N_T$ of transmissions, the maximum number $N_R$ of reflections, and the maximum number $N_D$ of diffractions.

In step S801 in FIG. 8, on the other hand, the first ray tracing unit 13 determines a two-dimensional ray trace with limiting routes from the transmission point to the reception point via a structural object in the building, to a route from the transmission point to the reception point via a structural object having a line of sight from the transmission point or from the reception point.

For example, the first ray tracing unit 13 identifies a structural object having a line of sight from the transmission point (such a structural object will be hereinafter referred to as a Tx line-of-sight structural object), and a structural object having a line of sight from the reception point (such a structural object will be hereinafter referred to as a Rx line-of-sight structural object), among the structural objects in the building. In a specific example, in a case where the environment data 21 includes LIDAR data and the like in a building, the first ray tracing unit 13 may identify a Tx line-of-sight structural object and a Rx line-of-sight structural object, on the basis of the LIDAR data. In another example, in a case where the structural object data 22 is three-dimensional CAD data, the first ray tracing unit 13 may analyze the three-dimensional CAD data, to identify a Tx line-of-sight structural object and a Rx line-of-sight structural object.

Also, the first ray tracing unit 13 determines a two-dimensional ray trace with limiting routes from the transmission point to the reception point via a structural object in the building, to the following three routes, for example.

1) A route from the transmission point to the reception point via a Tx line-of-sight structural object.

2) A route from the transmission point to the reception point via a Tx line-of-sight structural object and a Rx line-of-sight structural object.

3) A route from the transmission point to the reception point via a Rx line-of-sight structural object.

As a result, the first ray tracing unit 13 can determine the principal ray contributing to estimation of the intensity of the radio wave at the reception point at a higher speed with a smaller amount of calculation.

Note that the above three routes are examples, and various modifications or applications are possible. For example, a Tx line-of-sight structural object and a Rx line-of-sight structural object may be building walls, columns, or the like included in the building data 23.

As described above, according to Example 3, it is possible to provide an information processing system that further prevents an increase in the calculation amount when ray tracing is performed in an environment such as an indoor environment in which many structural objects exist.

Note that, in each of the example of cases described above, ray tracing is performed in an indoor environment. However, the ray trace method according to the present embodiment can also be applied in a case where ray tracing is performed in an outdoor environment in which the floor is replaced with the ground, and many structural objects exist, for example.

<Example Hardware Configuration>

The information processing system 1 according to the present embodiment can be formed with a computer that is made to execute a program in which the processing contents described in the present embodiment are written.

The above program can be stored or distributed, being recorded in a computer-readable recording medium (a portable memory or the like). Further, the above program can also be provided through a network such as the Internet or electronic mail.

FIG. 9 is a diagram illustrating an example of a hardware configuration of the computer mentioned above. A computer 900 in FIG. 9 includes a drive device 1000, an auxiliary storage device 1002, a memory device 1003, a CPU 1004, an interface device 1005, a display device 1006, an input device 1007, and an output device 1008 that are connected to one another by a bus B.

The program for performing processes in the computer 900 is provided through a recording medium 1001 such as a CD-ROM or a memory card, for example. When the recording medium 1001 that stores the program is set in the drive device 1000, the program is installed from the recording medium 1001 into the auxiliary storage device 1002 via the drive device 1000. However, the program is not necessarily installed from the recording medium 1001, but may be downloaded from another computer via a network. The auxiliary storage device 1002 stores the installed program, and also stores necessary files, data, and the like.

In a case where an instruction to start the program is given, the memory device 1003 reads the program from the auxiliary storage device 1002, and stores the program therein. In accordance with the program stored in the memory device 1003, the CPU 1004 implements the functions related to the respective components described in the present embodiment. The interface device 1005 is used as an interface for connecting to a network. The display device 1006 displays a GUI or the like according to the program. The input device 1007 is formed with a keyboard and a mouse, buttons, a touch panel, or the like, and is used to input various operation instructions. The output device 1008 outputs a calculation result. Note that the information processing system 1 need not include the display device 1006 and/or the input device 1007.

<Effects of the Embodiment>

The technology according to the present embodiment can provide an information processing system that prevents an increase in the calculation amount when ray tracing is performed in an environment such as an indoor environment in which many structural objects exist.

SUMMARY OF THE EMBODIMENT

This specification discloses at least the information processing system, the ray trace method, and the program in accordance with the respective items listed below.

(Item 1)

An information processing system including:

a first ray tracing unit configured to determine a two-dimensional ray trace from a transmission point at which a radio wave is transmitted, to a reception point at which the radio wave is received;

a second ray tracing unit configured to determine a three-dimensional ray trace corresponding to the two-dimensional ray trace, using height information about the transmission point and the reception point; and a radio field intensity calculation unit configured to calculate an intensity of the radio wave at the reception point, using one or more of three-dimensional ray traces determined by the second ray tracing unit.

(Item 2)

The information processing system of item 1, in which the first ray tracing unit is configured to determine the two-dimensional ray trace from the transmission point at which the radio wave is transmitted in the building to the reception point at which the radio wave is received in the building, using environment data indicating a structural object present in the building and the inside of the building, and the second ray tracing unit is configured to determine the three-dimensional ray trace corresponding to the two-dimensional ray trace, using height information about the transmission point and the reception point, and the environment data.

(Item 3)

The information processing system of item 1 or 2, in which the first ray tracing unit is configured to determine the two-dimensional ray trace within a range of a predetermined number of transmissions, a predetermined number of reflections, and a predetermined number of diffractions.

(Item 4)

The information processing system of item 1 or 2, in which the first ray tracing unit is configured to determine the two-dimensional ray trace with limiting a route from the transmission point to the reception point via a structural object, to a route from the transmission point to the reception point via a structural object having a line of sight from the transmission point or the reception point.

(Item 5)

The information processing system of any one of items 1 to 4, in which the second ray tracing unit is configured to, when determining one of a reflected ray or a diffracted ray in the three-dimensional ray trace, determine the one of the reflected ray or the diffracted ray with restricting a launch angle of ray launching.

(Item 6)

The information processing system of any one of items 1 to 5, in which the second ray tracing unit is configured to, when determining a diffracted ray in the three-dimensional ray trace, determine the diffracted ray by replacing a structural object present between the transmission point and the reception point with a flat metal plate when there is not a line of sight in a route between the transmission point and the reception point.

(Item 7)

The information processing system of item 6, in which the second ray tracing unit is configured to, when there is a plurality of structural objects between the transmission point and the reception point, determine the diffracted ray, using a Bullington model.

(Item 8)

The information processing system of any one of items 1 to 7, in which the second ray tracing unit is configured to determine the two-dimensional ray trace from the transmission point to the reception point in a vertical plane, when there is not a line of sight from the transmission point to the reception point in a two-dimensional ray trace from the transmission point to the reception point in a horizontal plane, and determine that there is not a line of sight in the route between the transmission point and the reception point, when there is not a line of sight from the transmission point to the reception point in the two-dimensional ray trace in the vertical plane.

(Item 9)

A ray trace method including:

a first ray tracing process of determining a two-dimensional ray trace from a transmission point at which a radio wave is transmitted, to a reception point at which the radio wave is received;

a second ray tracing process of determining a three-dimensional ray trace corresponding to the two-dimensional ray trace, using height information about the transmission point and the reception point; and a radio field intensity calculation process of calculating an intensity of the radio wave at the reception point, using one or more of three-dimensional ray traces determined in the second ray tracing process, wherein the first ray tracing process, the second ray tracing process, and the radio field intensity calculation process are performed by an information processing system.

(Item 10)

A program for causing an information processing system to perform:

a first ray tracing process of determining a two-dimensional ray trace from a transmission point at which a radio wave is transmitted, to a reception point at which the radio wave is received;

a second ray tracing process of determining a three-dimensional ray trace corresponding to the two-dimensional ray trace, using height information about the transmission point and the reception point; and a radio field intensity calculation process of calculating an intensity of the radio wave at the reception point, using one or more of three-dimensional ray traces determined in the second ray tracing process.

Although the present embodiment has been described above, the present invention is not limited to such a specific embodiment, and various modifications and changes can be made within the scope of the present invention described in the claims.

REFERENCE SIGNS LIST 1 information processing system
13 first ray tracing unit
14 second ray tracing unit
15 radio field intensity calculation unit
21 environment data
301 transmission point
302 reception point
311 two-dimensional ray trace
312 three-dimensional ray trace
1000 drive device
1001 recording medium
1002 auxiliary storage device
1003 memory device
1004 CPU
1005 interface device
1006 display device
1007 input device
1008 output device

The invention claimed is:

1. An information processing system comprising:

a processor configured to determine a two-dimensional ray trace from a transmission point at which a radio wave is transmitted, to a reception point at which the radio wave is received;

determine a three-dimensional ray trace corresponding to the two-dimensional ray trace, using height information about the transmission point and the reception point;

calculate an intensity of the radio wave at the reception point, using one or more three-dimensional ray traces determined, and determine a diffracted ray in the three-dimensional ray trace with replacing a structural object present between the transmission point and the reception point with a flat metal plate when there is no line of sight in a route between the transmission point and the reception point.

2. The information processing system according to claim 1, wherein the processor is further configured to determine the two-dimensional ray trace from the transmission point at which the radio wave is transmitted in a building to the reception point at which the radio wave is received in the building, using environment data indicating a structural object present in the building and the inside of the building, and determine the three-dimensional ray trace corresponding to the two-dimensional ray trace, using height information about the transmission point and the reception point, and the environment data.

3. The information processing system according to claim 1, wherein the processor is further configured to determine the two-dimensional ray trace within a range of a predetermined number of transmissions, a predetermined number of reflections, and a predetermined number of diffractions.

4. The information processing system according to claim 1, wherein the processor is further configured to determine the two-dimensional ray trace with limiting a route from the transmission point to the reception point via a structural object, to a route from the transmission point to the reception point via a structural object having a line of sight from the transmission point or the reception point.

5. The information processing system according to claim 1, wherein the processor is further configured to, when determining one of a reflected ray or a diffracted ray in the three-dimensional ray trace, determine the one of the reflected ray or the diffracted ray with restricting a launch angle of ray launching.

6. The information processing system according to claim 1, wherein the processor is further configured to, when there is a plurality of objects between the transmission point and the reception point, determine the diffracted ray, using a Bullington model.

7. The information processing system according to claim 1, wherein the processor is further configured to determine the two-dimensional ray trace from the transmission point to the reception point in a vertical plane, when there is not a line of sight from the transmission point to the reception point in a two-dimensional ray trace from the transmission point to the reception point in a horizontal plane, and determine that there is not a line of sight in the route between the transmission point and the reception point, when there is not a line of sight from the transmission point to the reception point in the two-dimensional ray trace in the vertical plane.

8. A ray trace method comprising:

determining a two-dimensional ray trace from a transmission point at which a radio wave is transmitted, to a reception point at which the radio wave is received;

determining a three-dimensional ray trace corresponding to the two-dimensional ray trace, using height information about the transmission point and the reception point;

calculating an intensity of the radio wave at the reception point, using one or more three-dimensional ray traces determined; and determine a diffracted ray in the three-dimensional ray trace with replacing a structural object present between the transmission point and the reception point with a flat metal plate when there is no line of sight in a route between the transmission point and the reception point, wherein the determining a two-dimensional ray trade, the determining a three-dimensional ray trance, and the calculating an intensity of the radio wave are performed by an information processing system.

9. A computer-readable non-transitory recording medium storing a program for causing an information processing system to:

determine a two-dimensional ray trace from a transmission point at which a radio wave is transmitted, to a reception point at which the radio wave is received;

determine a three-dimensional ray trace corresponding to the two-dimensional ray trace, using height information about the transmission point and the reception point;

calculate an intensity of the radio wave at the reception point, using one or more three-dimensional ray traces determined in the second ray tracing process, and determine a diffracted ray in the three-dimensional ray trace with replacing a structural object present between the transmission point and the reception point with a flat metal plate when there is no line of sight in a route between the transmission point and the reception point.

\* \* \* \* \*